United States Patent [19]

Zincone et al.

[11] Patent Number: 4,652,122
[45] Date of Patent: Mar. 24, 1987

[54] GUST DETECTION SYSTEM

[75] Inventors: Robert Zincone, Norwalk; Evan A. Fradenburgh, Fairfield, both of Conn.

[73] Assignee: United Technologies Corporation, Hartford, Conn.

[21] Appl. No.: 749,047

[22] Filed: Jun. 26, 1985

[51] Int. Cl.⁴ .................. G01P 3/36; G01N 21/00
[52] U.S. Cl. .......................... 356/28.5; 356/5; 356/342
[58] Field of Search ............... 356/28.5, 342, 5

[56] References Cited

U.S. PATENT DOCUMENTS

| | | | |
|---|---|---|---|
| 3,528,741 | 9/1970 | Benson et al. | 356/28.5 |
| 3,984,685 | 10/1976 | Fletcher et al. | 356/28.5 |
| 3,998,552 | 12/1976 | Stewart | 356/342 |
| 4,167,329 | 9/1979 | Jelalian et al. | 356/5 |
| 4,359,640 | 11/1982 | Geiger | 356/342 |
| 4,585,341 | 4/1986 | Woodfield | 356/28.5 |
| 4,589,070 | 5/1986 | Kyrazis | 356/28.5 |

Primary Examiner—Stephen C. Buczinski
Attorney, Agent, or Firm—Gerald E. Linden

[57] ABSTRACT

Air turbulence ahead of an aircraft is determined by scanning the beam of a variable focal distance laser airspeed unit close-in to the aircraft to determine aircraft airspeed and angle of attack, and scanning the beam at distances farther out from the aircraft and measuring airspeed. Discrepancies between the close-in measurement and the farther out measurement are quantifiably indicative of air turbulence.

6 Claims, 14 Drawing Figures

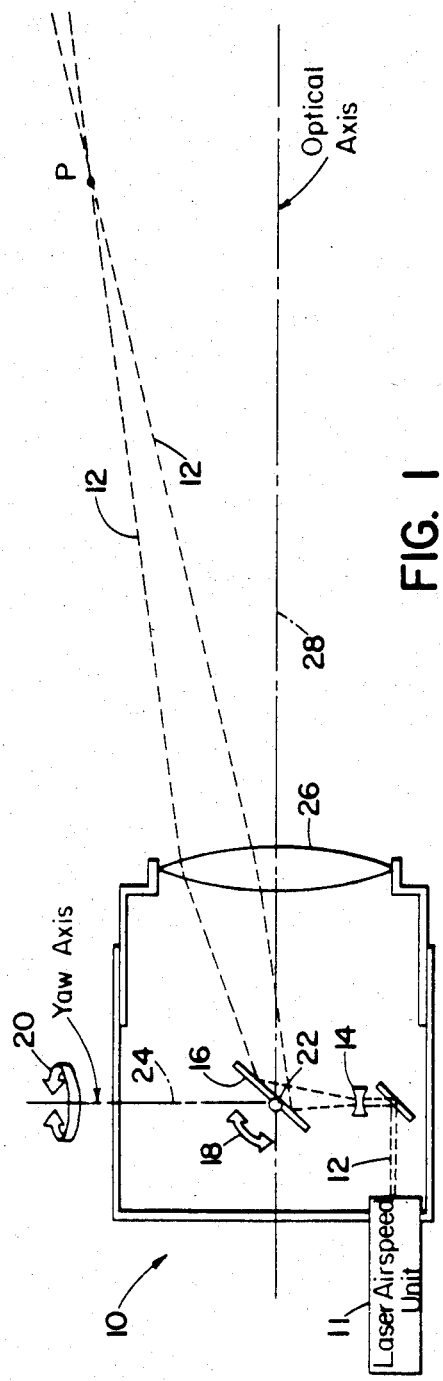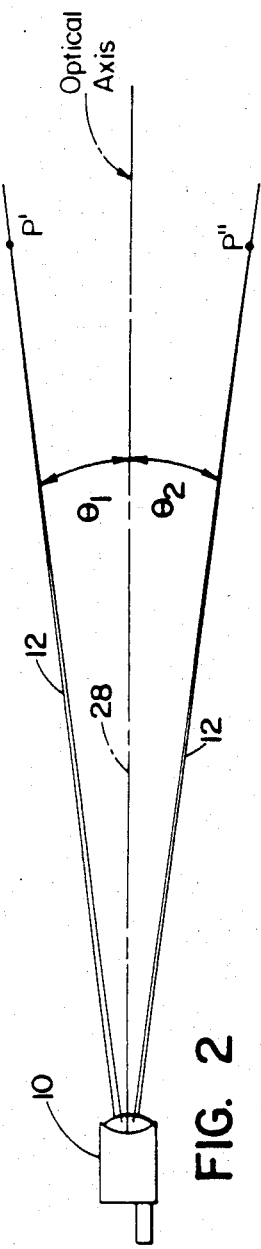
FIG. 1
FIG. 2

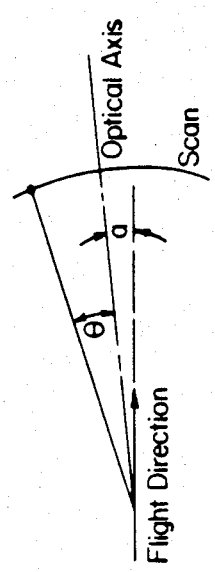
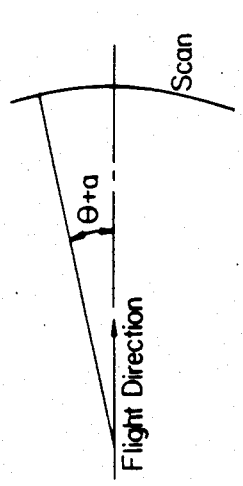
FIG. 8
FIG. 9
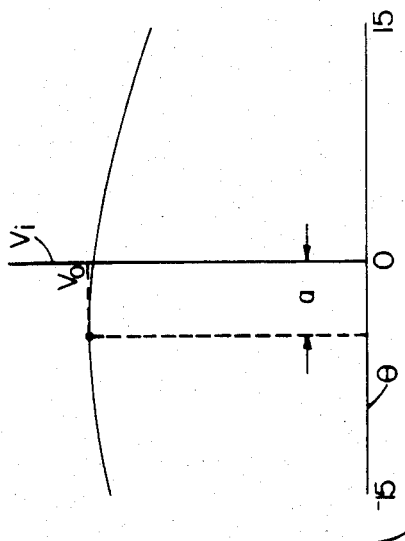
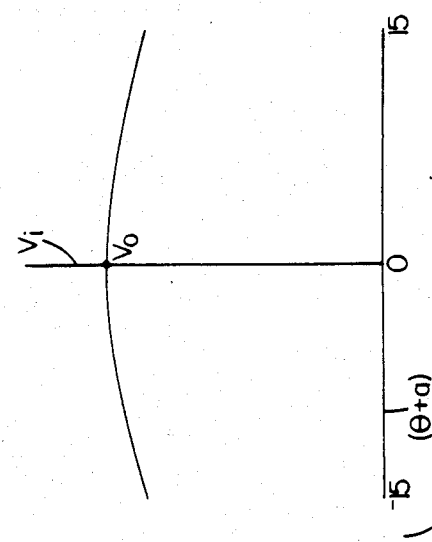

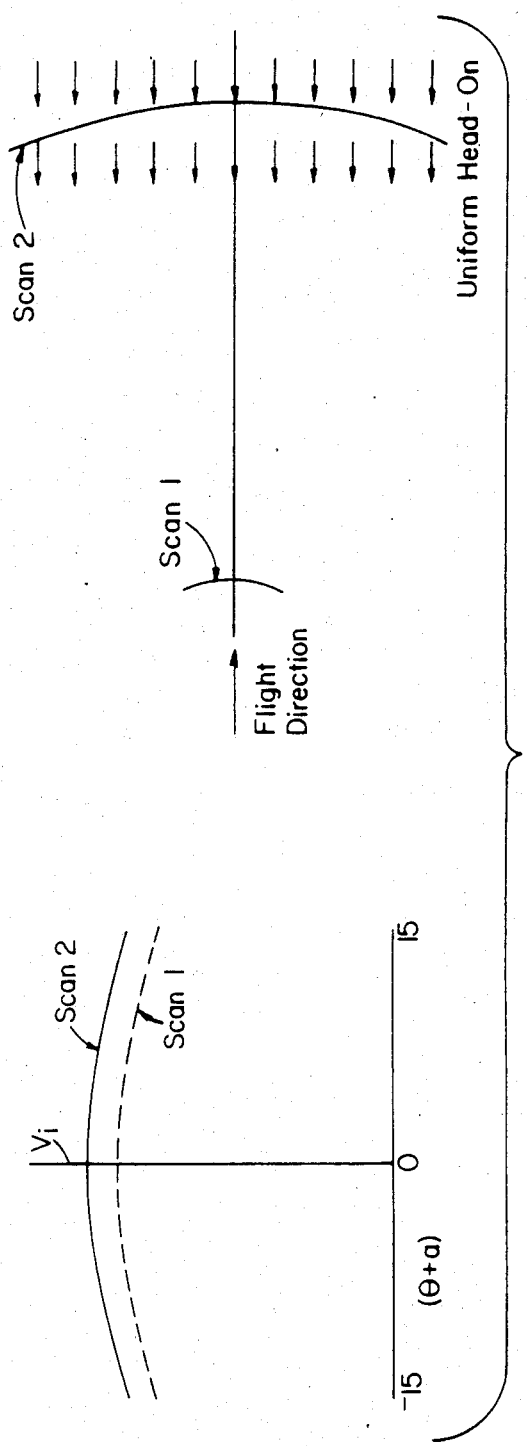

GUST DETECTION SYSTEM

TECHNICAL FIELD OF THE INVENTION

The invention relates to techniques for detecting gusts and windshear ahead of an aircraft.

BACKGROUND OF THE INVENTION

Clear air turbulence can occur either naturally or as a result of the passage of aircraft which leave vortex trails and downwash patterns. Encountering such phenomena in a highly responsive aircraft can cause undesirable buffeting, load factor problems, etc., despite the existence of Stability Augmentation Systems (SAS). Not only is such unpredictable aircraft response distracting from a pilot or passenger's point of view, but it can also affect the weapon aiming/delivery capability of military aircraft.

DISCLOSURE OF THE INVENTION

Therefore, it is an object of the invention to provide a technique for detecting clear air turbulence, thereby enhancing aircraft safety, smoothness, and stability.

According to the invention, air turbulence ahead of an aircraft is determined by scanning the beam of a variable focal distance laser airspeed unit close-in to the aircraft to determine aircraft airspeed and angle of attack, and scanning the beam at distances farther out from the aircraft and measuring airspeed. Discrepancies between the closein measurement and the farther out measurement are quantifiably indicative of air turbulence.

Other objects, features and advantages of the invention will become apparent in light of the following description thereof.

BRIEF DESCRIPTION OF THE DRAWINGS

FIG. 1 is a schematic highlighting the basic elements of the gust detection system of this invention. The system emits a scanning beam 12.

FIG. 2 is a schematic of the beam scanning in elevation.

FIG. 8 is a graph and schematic of the measured velocity components for a continuous vertical scan for calm air or near in to the system.

FIG. 9 is a replot for the conditions of FIG. 8 using a different reference.

FIG. 11 is a graph and schematic of two scans; one close in, and another more distant scan in a region wherein there is a uniform head-on gust.

BEST MODE FOR CARRYING OUT THE INVENTION

Figure 3:
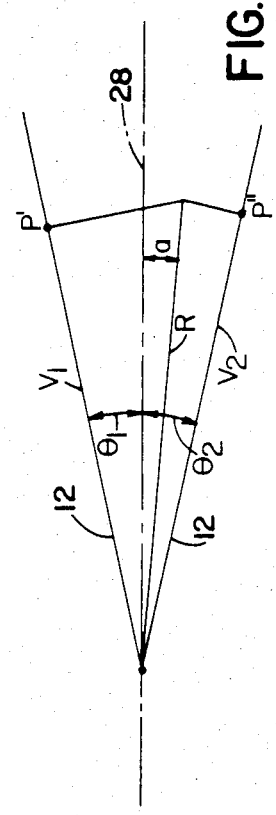
FIG. 3 is a vector diagram of the beam scanning in elevation.

It is known to monitor clear air turbulence (CAT) in an aircraft's flight path by projecting a laser beam in the flight path of the aircraft and detecting the backscattered radiation from atmospheric aerosols. For instance, U.S. Pat. No. 4,359,640 (Geiger, 1982), entitled CLEAR AIR TURBULENCE DETECTION, shows such a system which is limited, however, to using a pair of pulse lasers for generating a pair of coherent beams arranged to converge at a point in front of the aircraft's flight path (claim 1, therein).

In commonly-owned U.S. Pat. No. 4,340,299 (Mongeon, 1982), entitled OPTICAL DOPPLER RADAR SYSTEM USING A CONICALLY SCANNED LASER BEAM, a laser of a first frequency is conically scanned on a surface from an elevated position and the beam is scattered by the surface. A return beam is formed from this scattered beam and is mixed with a single side band suppressed carrier laser beam at an offset frequency, producing an electrical signal whose frequency shifts from the offset frequency in proportion to the velocity relative to the surface. That shift is a function of the scan position and the direction of movement. Velocity components of the signal reflecting drift velocity and heading velocity are resolved from this signal by referencing it to the scan position at drift and heading positions. The signal component reflecting elevation velocity is resolved by removing those scan dependent components. The scanning system and signal processing techniques of the Mongeon Patent are especially well-suited to the present invention.

FIG. 1 shows the basic configuration for the gust detection system 10 of this invention.

A laser airspeed unit 11 projects a laser beam 12 through a diverging lens 14 to a scanning mirror 16. The scanning mirror is operated by mechanisms (not shown) which will tilt the mirror in the directions shown by the arrows 18 and 20, about the aircraft pitch axis 22 for elevation scan, and about the aircraft yaw axis 24 for azimuth scan. A focusing lens 26 is movable along an optical axis 28, via a suitable mechanism, to converge the beam 12 at a point P, a desired distance in front of the aircraft; for example, between 10 and 100 meters.

It is preferable to use a pulsed laser, rather than a continuous wave type in the Laser Airspeed Unit. A pulsed laser allows for lighter weight and lower power, and distance to the reflecting aerosols is simply a matter of measuring the time delay between a transmitted and subsequent reflected pulse. With either type of laser, the doppler shift of the reflected beam converts directly to aircraft velocity relative to the aerosol "target". The laser airspeed unit 10 contains the necessary circuitry for resolving distance and relative velocity, in a known manner.

To determine the resultant velocity vector between the aircraft and the aerosol target it is necessary to scan the beam in both elevation and azimuth. FIG. 2 illustrates how the beam might be aimed in two successive elevations: an angle $\theta_1$ above the optical axis 28 converging at point p' and an angle $\theta_2$ below the optical axis 28 converging at a point p". This provides two components of velocity: $V_1$ measured parallel to the upper beam and $V_2$ measured parallel to the lower beam. The resultant velocity R and its angle of attack (a) to the optical axis 28 are determined by the vector diagram in FIG. 3 and the following equations.

$$V_1 = R \cos(\theta_1 + a)$$

$$V_2 = R \cos(\theta_2 - a)$$

A similar procedure, requiring at least two azimuthal positions of the beam, is followed to establish the lateral component of velocity which may be represented as a sideslip angle. In practice, a continuous sweep in elevation and azimuth, such as a conical sweep, is more likely to be used than discrete points.

The FIG. 3 vector diagram assumes that the velocity vectors $V_1$ and $V_2$ are measured at two points sufficiently close together so that the true total velocity vector has the same magnitude and direction at each point. In still air (no turbulence) this will be generally true, but in gusty air it will not be generally true. If the air is scanned quite close to the aircraft (10 meters), the assumption of the same total velocity at the two points, or over the scanned region, will be valid for most practical purposes. Thus, it is advisable to scan close to the aircraft to measure the aircraft true airspeed (velocity, angle of attack, and sideslip angle). Gust information is then obtained by scanning at additional distances farther from the aircraft.

Many scanning patterns are possible; some possible patterns are illustrated in FIGS. 4–7.

Figure 4:
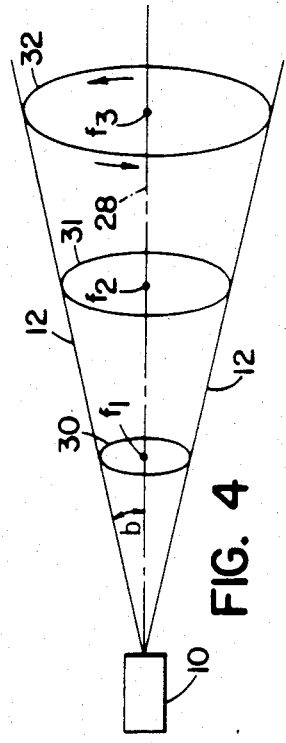
FIG. 4 is a schematic of the beam scanning conically at a fixed apex angle, at various distances ahead of the system.

FIG. 4 shows the scanning pattern that would result from adapting a variable focal distance focusing lens to a gust detection system having a fixed conical sweep angle. The fixed apex angle (b) of the conical sweep results in larger circles 30–32 as the focal distance ($f_1, f_2, f_3$) is increased, a disadvantage if it is desired to detect fine structure of the air turbulence at considerable distance from the aircraft.

Figure 5:
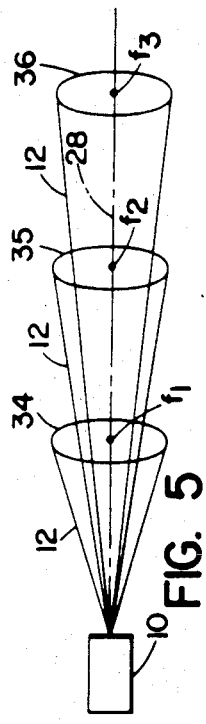
FIG. 5 is a schematic of the beam scanning conically at a variable apex angle, at various distances ahead of the system.

FIG. 5 shows another conical scanning pattern with a variable apex angle. This feature can be used to keep the diameter of the swept circles 34–36 constant with distance, or alternately can provide multiple sweeps of varying diameter at given focal distances ($f_1, f_2, f_3$) from the aircraft.

Figure 6:
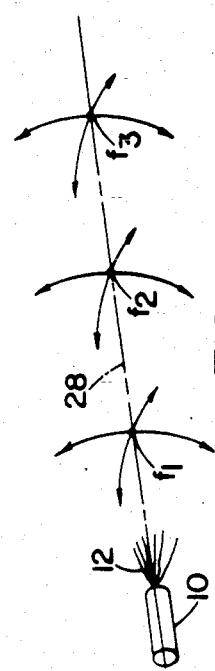
FIG. 6 is a schematic of the beam scanning in a cruciform scan pattern, at various distances ahead of the system.

FIG. 6 shows a cruciform scan pattern, where independent sweeps in vertical and horizontal planes are made at each focal distance ($f_1, f_2, f_3$) of interest.

Figure 7:
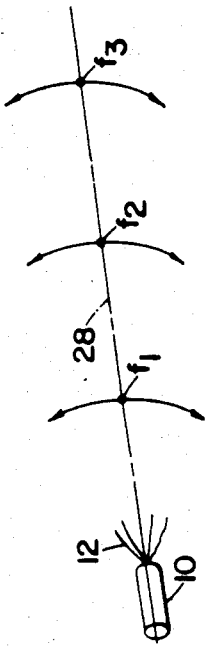
FIG. 7 is a schematic of the beam scanning in elevation only, at various distances ahead of the system.

FIG. 7 shows a scan in the vertical plane only. For most gust situations of interest, the aircraft responds primarily in the pitch axis, or plane of symmetry; the response to lateral gust inputs is generally much less and therefore of less interest.

The measured velocity components for a continuous vertical scan for various possible atmospheric conditions are shown in FIGS. 8 through 12. It is assumed that lateral velocity components are small enough to be neglected. If the indicated velocity $V_i$ is plotted versus the laser beam angle $\theta$, measured with respect to the optical axis, positive upward, the general shape of the curve will be as in FIG. 8 if the air is calm or if the scan is close to the aircraft. $V_o$ is the magnitude of the peak of the curve, which occurs at $\theta = -a$, where a is the angle of attack of the aircraft with respect to the optical axis. The value of $V_i$ will vary according to the formula $V_i = V_o \cos(\theta + a)$. The peak of the curve will be on the left if the angle of attack of the optical axis is positive, i.e. aimed above the flight path.

If the curve of FIG. 8 is replotted as $V_i$ versus $(\theta + a)$, the curve becomes symmetrical about the vertical axis of the plot, as shown in FIG. 9. This still represents the calm air case, or the case for a scan close to the aircraft on a turbulent day.

Figure 10:
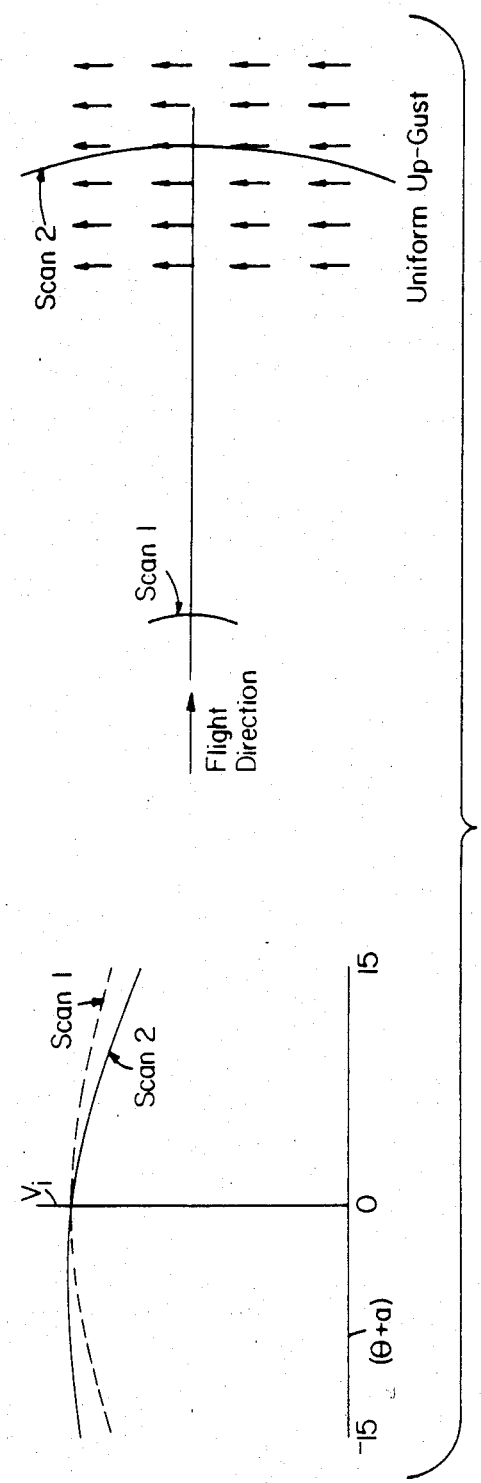
FIG. 10 is a graph and schematic of two scans; one close in, and another more distant scan in a region wherein there is a uniform up-gust.

FIG. 10 shows the results of two vertical scans when the more distant scan is in a region with a uniform upgust having a velocity $V_{gust}$. Scan 1, near the aircraft, produces an indicated velocity profile identical in character to that shown in FIG. 9, according to the formula $V_i = V_o \cos(\theta + a)$. Scan 2, distant from the aircraft, produces a velocity profile which increases the indicated speed for beam angles below the flight path, i.e. $(\theta + a)$ negative, and decreases the indicated speed for beam angles above the flight path, i.e. $(\theta + a)$ positive, according to the formula, $$V_i = V_o \cos(\theta + a) - V_{gust} \sin(\theta + a).$$

The incremental speed is minus the gust velocity times the sine of the angle $(\theta + a)$.

FIG. 11 shows comparable results for an oncoming head-on gust having a velocity $V_{gust}$. Scan 1, near the aircraft, is determined accordinq to the formula, $$V_i = V_o \cos(\theta + a);$$

and Scan 2, distant from the aircraft, is determined according to the formula, $$V_i = (V_o + V_{gust}) \cos(\theta + a).$$

In this case the shape of the indicated velocity profile is unchanged but the magnitudes are increased by a constant percentage.

Any uniform gust situation can be represented as some combination of vertical and horizontal gusts, so that the equations related to FIGS. 10 and 11 may be used to derive the two gust velocity components. In practice, the data will show scatter and will not follow the ideal profiles precisely. Standard curve-fitting techniques can be used to establish the principal gust velocity components, and the magnitude of the scatter will correspond to a general turbulence superimposed on the principal gust.

One type of departure from a uniform gust that is of particular interest is the presence of a trailing vortex produced by an aircraft having flown past the vicinity. Trailing vortices, usually found in pairs, are characterized by relatively small size, high velocities around the core, and a life up to several minutes, depending on a number of factors. Because of their intensity they can sometimes represent a serious gust encounter to be avoided. They also provide evidence of the previous passage of another aircraft, and so can provide important intelligence information in a military engagement.

Figure 12:
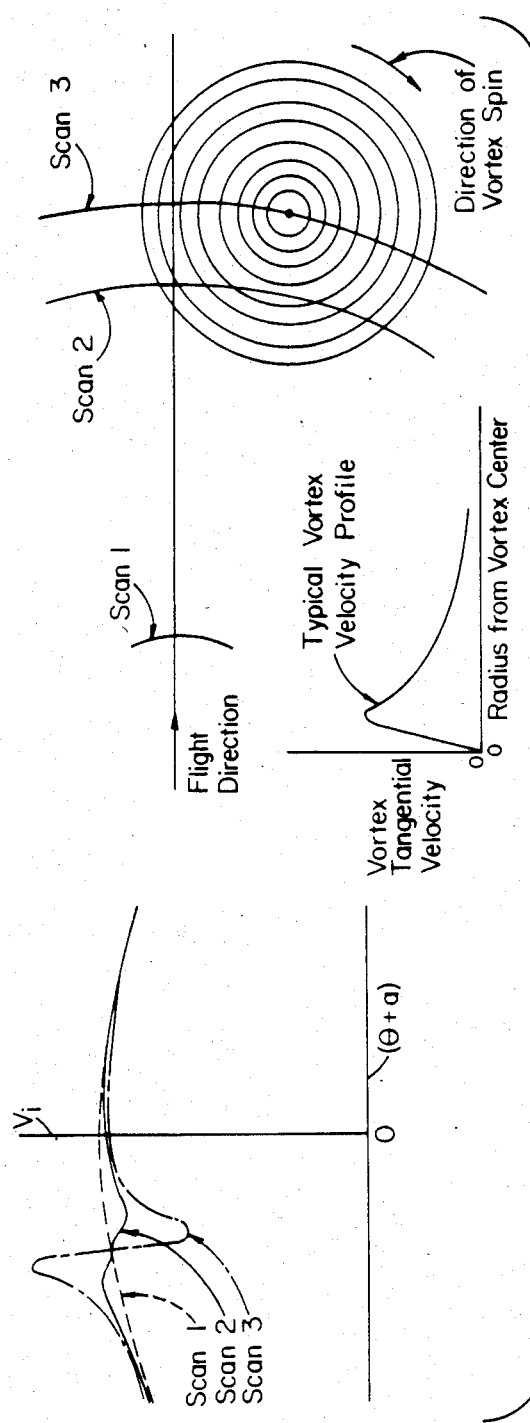
FIG. 12 is a graph and a schematic of three scans; one close in, and two more distant scans in a region where there is a vortex. Another graph shows the vortex velocity profile.

FIG. 12 shows indicated velocity profiles representative of a vortex crossing below the flight path of the scanning aircraft. As in previous examples, the Scan 1 is close to the aircraft. The Scan 2 detects the presence of a vortex, revealed by the characteristic nonlinear departure of the indicated velocity from the Scan 1 profile. By further adjustment of the beam focal distance, it is possible to locate the core of the vortex; this will be a scan with the largest indicated velocity deviation from the Scan 1 profile. Scan 3 of FIG. 12 goes through the center of the vortex, and the indicated velocity profile for Scan 3 shows the large local disturbance around the vortex core, which is centered about the vortex core, which is centered about the elevation at which the velocity profile crosses the Scan 1 profile.

Figure 13:
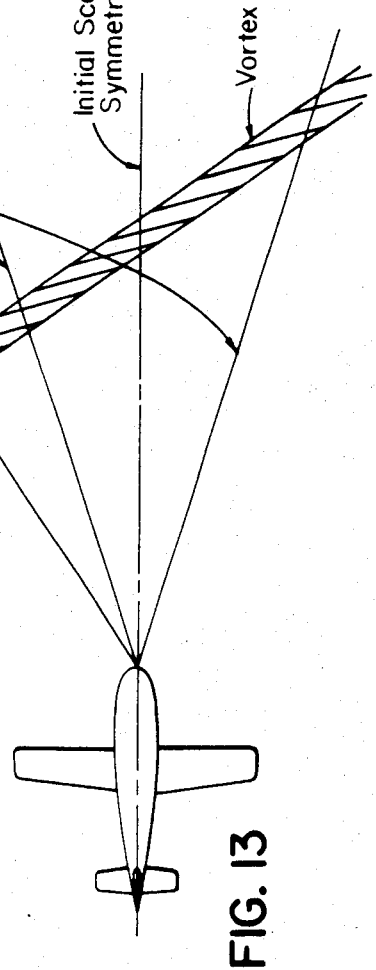
FIG. 13 is a plan view schematic of the beam scanning in various vertical planes at different azimuths.
Figure 14:
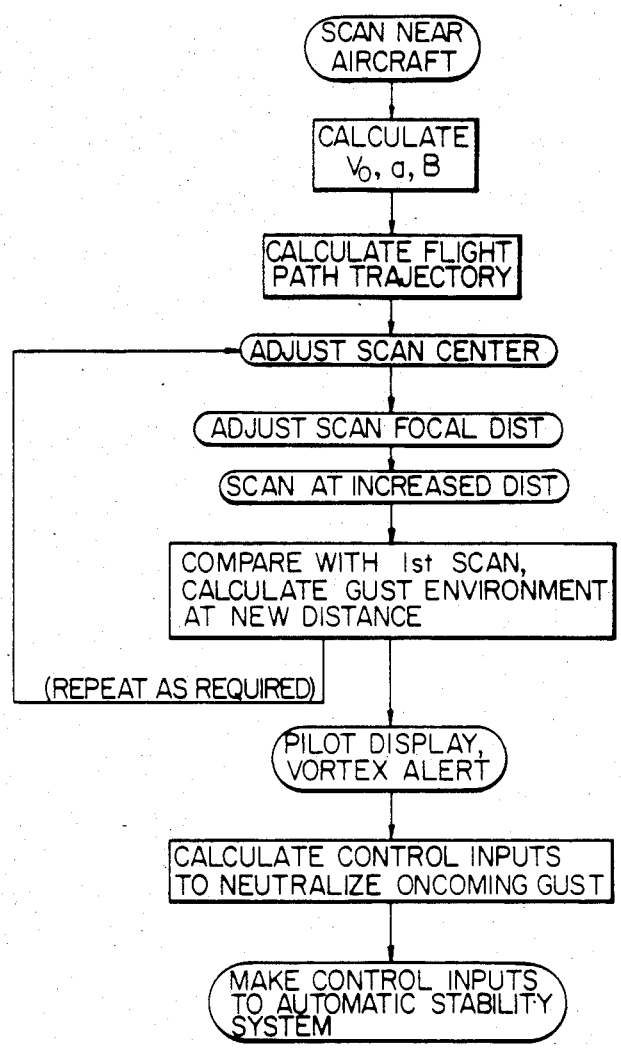
FIG. 14 is a gross operational block diagram for the general case of operation of the gust detection system of this invention.

FIG. 13 illustrates how the ability to alter the azimuth of the scanning beam can be utilized to locate a vortex in three dimensions. This shows an aircraft in plan view, initially scanning vertically in the plane of symmetry (in and out of the drawing). Once a vortex is detected, additional scans in vertical planes with various azimuth orientations can be used to locate the center of the vortex as a line in three-dimensional space. The operation of the Gust Detection System is illustrated in block diagram form in FIG. 14. A verbal description of the operation of the system for the general case is as follows:

(a) Conduct a circular or cruciform scan with the laser airspeed sensor close to the aircraft. Calculate the velocity vector $V_o$ relative to the aircraft reference axis, including angle of attack a and sideslip angle B.

(b) (Optional) Calculate rate of climb by calculating component of velocity perpendicular to the horizontal plane, which is determined by reference to standard inertial attitude devices.

(c) From velocity, angle of attack, and sideslip measurements, along with independent measurements of body linear and angular acceleration calculate near-term flight path trajectory.

(d) Adjust the center of the scan to coincide with the projected flight path; increase the focal distance of the laser airspeed unit, and scan in the desired pattern at the increased distance.

(e) Compare the results of the new scan with the initial scan close to the aircraft, and calculate the gust velocities at the new distance.

(f) Repeat steps d. and e. as desired to provide more complete information about the air volume into which the aircraft is flying.

(g) Transmit derived gust data to a pilot warning display and to a digital automatic flight control system, where stored information on aircraft dynamic characteristics is used to determine aircraft control system displacements required to neutralize the oncoming gust.

(h) As the aircraft encounters the gust, input the control displacements to minimize the disturbance.

(i) (Optional) If an indicated velocity profile from any scan shows the characteristics of a vortex from another aircraft, conduct additional vertical scans at different focal distances to locate core, and then conduct similar vertical sweeps at other beam azimuth angles off flight path to define the vortex in three dimensions.

The scanning frequency has not been mentioned above. The appropriate frequency is dependent on the speed of flight; a high speed airplane will fly into a nearby gust more rapidly than a helicopter flying slowly in the nap of the earth. It will usually be desired to have at least a one-second warning to allow for computation time with an on-board computer and to activate the controls. The laser beam travels at the speed of light and the computations are very rapid. The scanning mechanism and focal length changes involve relatively low inertias; with modern servo actuators a scan should be possible in 1/20 second or less and a complete cycle with multiple focal distances should be possible in less than one-half second, and a complete update should be possible two times per second or faster.

The control inputs provided by the Gust Detection System (see FIG. 14) are conveniently provided to an automatic Stability Augmentation System (SAS) having high rates and low authority. Typically the rate, or gain, of such a system is either fixed, varied with airspeed, or varied by means of an adaptive controller. This is discussed in detail in commonly-owned U.S. Pat. No. 4,032,033 (Maciolek, 1977), entitled AUTOMATIC GAIN CONTROL FOR STABILITY AUGMENTATION SYSTEMS, which discloses a technique for automatically varying the gain of a SAS in accordance with gross weight and deviations of the center of gravity of the aircraft.

To practice the invention in the context of a SAS as disclosed in the Maciolek Patent, the control inputs could be provided to close the switches 50, 54, 56 therein which vary the gain of the SAS in stepwise fashion.

In another commonly-owned U.S. Pat. No. 4,213,584 (Tefft et al., 1980), entitled HELICOPTER HOVER STABILITY AND CRUISE GUST EFFECT ALLEVIATION it is disclosed to vary the SAS inputs according to airspeed.

Thus, it can be seen that there are many ways in which the control inputs of this system can be utilized, in conjunction with an existing SAS so that oncoming gust effects can be both anticipated and alleviated.

It should be understood that various changes may be made to the invention without departing from the spirit and scope thereof.

We claim:

1. A method of detecting air turbulence in the flight path of an aircraft comprising:
   providing a variable focal distance laser airspeed unit in the aircraft to project a beam ahead of the aircraft at various focal distances;
   measuring the airspeed close to the aircraft at at least two points to determine the velocity and angle of angle of attack of the aircraft relative to still air;
   measuring the airspeed at a distance approximately one second's flight time ahead of the aircraft at at least two points to determine the velocity and angle of attack of the aircraft relative to still air; and
   determining that there is air turbulence at the distance further ahead of the aircraft based on a discrepancy between the measured airspeed close to the aircraft and the measured airspeed ahead of the aircraft.

2. The method of claim 1, further comprising scanning the beam in a circular pattern ahead of the aircraft to measure the airspeed, wherein the diameter of the circles increases with the distance from the aircraft.

3. The method of claim 1, further comprising scanning the beam in a circular pattern ahead of the aircraft to measure the airspeed, wherein the diameter of the circles remains the same with the distance from the aircraft.

4. The method of claim 1, further comprising scanning the beam in elevation only to measure the airspeed.

5. The method of claim 1, further comprising scanning the beam in azimuth only to measure the airspeed.

6. The method of claim 1, further comprising scanning the beam in a cruciform pattern ahead of the aircraft to measure the airspeed.

* * * * *

UNITED STATES PATENT AND TRADEMARK OFFICE
CERTIFICATE OF CORRECTION

PATENT NO. : 4,652,122

DATED : March 24, 1987

INVENTOR(S) : Robert Zincone et al

It is certified that error appears in the above-identified patent and that said Letters Patent is hereby corrected as shown below:

Column 6, Claim 1, Line 41   Delete "angle of"

Signed and Sealed this

Twenty-fourth Day of January, 1989

Attest:

DONALD J. QUIGG

Attesting Officer   Commissioner of Patents and Trademarks